United States Patent [19]

van der Lely

[11] 4,241,654
[45] Dec. 30, 1980

[54] FLY-WHEEL
[76] Inventor: Cornelis van der Lely, 7, Brüschenrain, Zug, Switzerland
[21] Appl. No.: 905,965
[22] Filed: May 15, 1978
[30] Foreign Application Priority Data May 5, 1977 [NL] Netherlands ............... 7704935

[51] Int. Cl.³ ............... B30B 1/00; F16D 7/00
[52] U.S. Cl. ................. 100/189; 74/572; 64/28 R; 403/DIG. 3
[58] Field of Search ............ 100/189; 74/572; 64/28 R; 403/2, DIG. 3

[56] References Cited
U.S. PATENT DOCUMENTS

| | | |
|---|---|---|
| 2,739,463 | 3/1956 | Pfister et al. ............... 64/28 R |
| 2,986,024 | 5/1961 | Power ............... 64/28 R |
| 3,464,345 | 9/1969 | Crane et al. ............... 100/189 |
| 4,055,967 | 11/1977 | Terranova et al. ............... 64/28 R |

*Primary Examiner*—Kenneth Dorner
*Attorney, Agent, or Firm*—William B. Mason

[57] ABSTRACT

An agricultural implement, such as a baler, has a fly-wheel connection that disconnects drive to the ram and other baler parts upon overload. The fly-wheel includes a first member on a driving shaft that is connected to a second member on a driven shaft through at least one shear pin. Preferably, there are a plurality of pins that can be advanced upon overload and reduction in driving speed, to automatically re-establish connection between the two members.

12 Claims, 10 Drawing Figures

FLY-WHEEL

According to a first aspect of the present invention there is provided a fly-wheel having a first member and a second member, the two members being interconnected for rotation together, in normal operation, by a shear pin and being rotatable relatively to one another after fracture of the shear pin upon overload, advancement means being provided for moving the shear pin, after fracture of the shear pin, to re-interconnect the two members.

According to a second aspect of the present invention there is provided a fly-wheel comprising a first member and a second member, the two members being interconnected for rotation together, in normal operation, by a shear pin and being rotatable relatively to one another after fracture of the shear pin upon overload, the shear pin being disposed in a holder, which is rigidly connected with the fly-wheel in normal operation, and being disposed radially with respect to the rotary axis of the fly-wheel, advancement means being provided for moving the shear pin, after fracture, to re-interconnect the two members.

According to a third aspect of the present invention there is provided a baler comprising a pressing ram and a driving mechanism for driving the pressing ram, the driving mechanism comprising a fly-wheel having a driving shaft and a driven shaft, the two shafts being interconnected for rotation together, in normal operation, by a shear pin and being rotatable relatively to one another after fracture of the shear pin upon overload, advancement means being provided for moving the shear pin, after fracture, to re-interconnect the two shafts.

According to a fourth aspect of the present invention there is provided a baler comprising a pressing mechanism and a driving mechanism for operating the pressing mechanism, the driving mechanism comprising a fly wheel having a driving shaft and a driven shaft, the two shafts being interconnected for rotation together, in normal operation, by a shear pin and being rotatable relatively to one another after fracture of the shear pin due to overload, the shear pin being disposed on the side of the fly-wheel facing the driven shaft.

With a construction in accordance with the present invention, it is possible to protect a driving mechanism including a fly-wheel against overload for a long time without any replacement of parts. In particular the fly-wheel construction can be used at places which are difficult of access at least during operation.

For a better understanding of the present invention and to show how it may be carried into effect, reference will now be made, by way of example only, to the accompanying drawings, in which.

Figure 1:
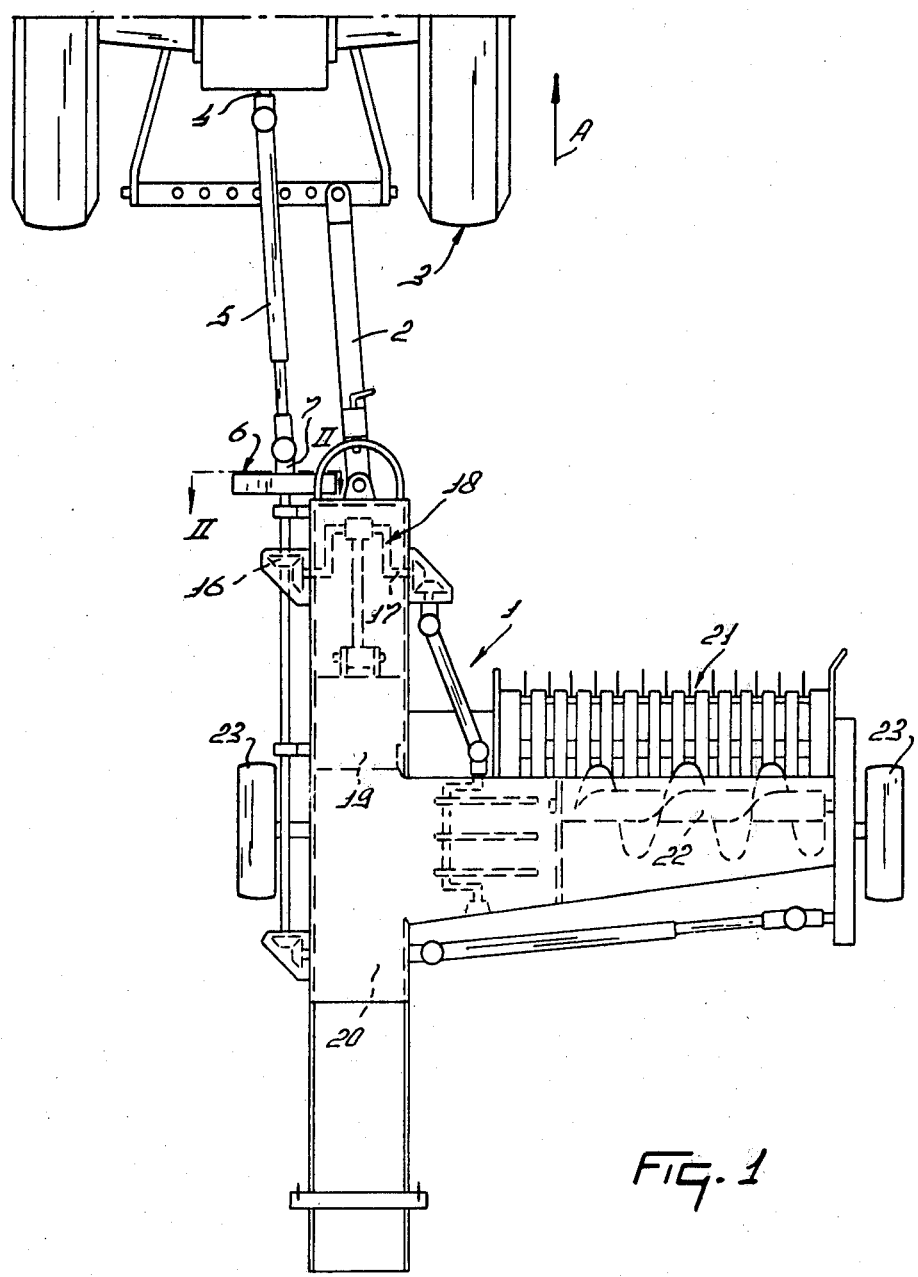
FIG. 1 is a plan view of an agricultural implement attached to a tractor and incorporating a fly-wheel.
Figure 3:
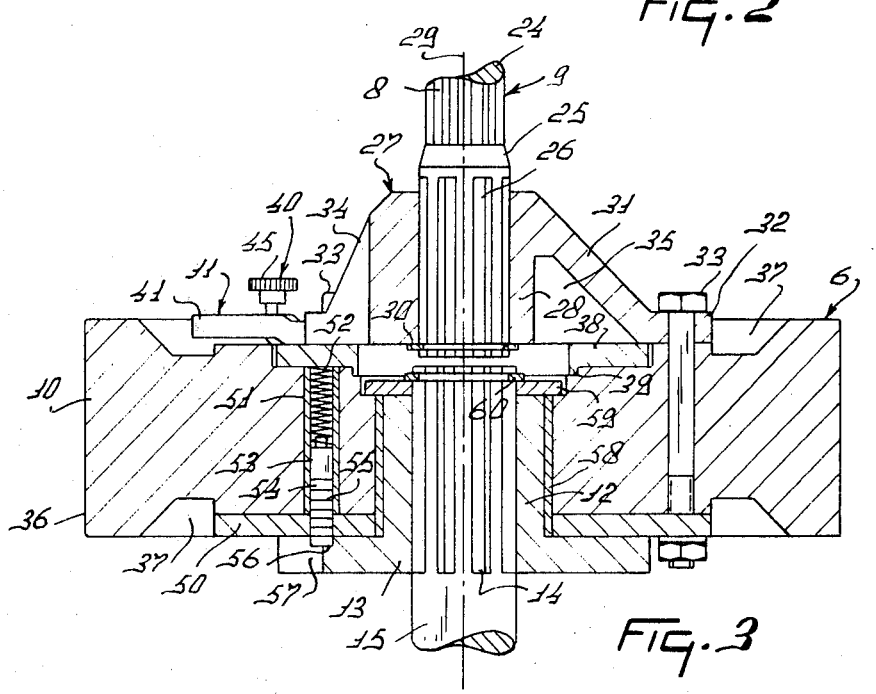
FIG. 3 is a sectional view taken on the line III—III in FIG. 2.

The agricultural implement shown in FIG. 1 is a baler 1, which is attached by a drawbar 2 to a tractor 3. The baler 1 is driven from the power take-off shaft 4 of the tractor through a propeller shaft 5. The propeller shaft 5 is coupled at its end away from the power take-off shaft 4 with a driving gear 6, a terminal portion 7 of the propeller shaft being slipped over a driving or input shaft 9 of the driving gear 6, this shaft 9 being provided with splines 8 (see FIG. 3).

The driving gear 6 comprises a fly-wheel 10 which is rigidly secured to the driving shaft 9 and comprises part of a shear pin coupling 11. The fly-wheel 10 includes an inertia member and constitutes a first coupling member, whereas a second coupling member is constituted by a hub 12, which has an integral flange 13. The hub 12 provides an axial supporting face for the fly-wheel 10 and the flange 13 provides a radial supporting face. The second coupling member is rigidly secured to a driven or output shaft 15 which is provided with splines 14 and is connected by a transmission mechanism 16 to a crankshaft 17 of a crank mechanism 18. The crank mechanism causes reciprocatory movement of a ram 19, which reciprocates along the intended direction of operative travel, indicated by an arrow A. The ram 19 moves in a compression channel 20 for compressing crop picked up by the baler 1. The compression channel 20 opens out at the rear, with respect to the direction A, where an outlet port is formed for ejecting bales compressed by the ram 19.

The baler 1 also comprises a pick-up drum 21 provided with tines which pick up the crop from the ground, and a feed worm conveyor 11 which co-operates with the pick-up drum 21. The conveyor 22 extends transversely of the direction A and pushes the crop towards the compression channel 20. The baler 1 is supported by two ground wheels 23 located one on each side of the baler.

Figure 4:
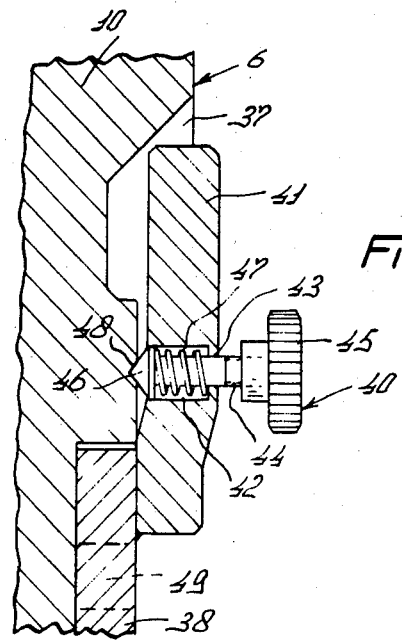
FIG. 4 is an enlarged view of part of the fly-wheel shown in FIG. 3.

The driving shaft 9 comprises a shaft portion 24, which has the splines 8 and serves for coupling the terminal portion 7 of the propeller shaft 5 with the shaft 9, and a shaft portion 25 of a slightly larger diameter, adjoining the shaft portion 24, splines 26 being provided on its periphery. The splines 26 provide a rotationally rigid connection of the shaft portion 25 with a star-shaped tie member 27 which is fitted on the shaft portion 25 and has a hub 28. Near the free end of the shaft portion 25 the hub 28 is fixed against movement, axially of the centerline 29 of the shaft 9, towards the fly-wheel 10 by a retaining ring 30. The centerline 29 coincides with the rotary axis of the fly-wheel 10. The tie member 27 has three supporting arms 31 which extend radially from the centerline 29. They are spaced apart from one another by equal angels and their ends away from the hub 28 are each provided with an outwardly directed terminal portion 32 which lies parallel to a plane perpendicular to the centerline 29. These portions 31 are rigidly secured by bolts 33 to the side of the fly-wheel 10 facing the driving shaft 9. The supporting arms 31 have walls 34 extending towards the fly-wheel 10 and bounding hollow spaces 35. The fly-wheel 10 has a diameter which is dependent on the construction of the agricultural implement 1 and with the associated driving gear 6, this diameter being in the range of 30 to 60 cms, preferably about 35 cms. Near the periphery 36, the fly-wheel 10 has its largest thickness (measured parallel to the centerline 29), which is about 5 to 20 cms, preferably about 10 cms. Depending on the characteristics of the driving gear 6, the fly-wheel 10 has a bulk of about 60 to 100 kgs. Near the periphery 36 of the fly-wheel, there is an annular cavity 37 on each side of the fly-wheel. The fly-wheel 10 is connected, within a circle passing through the bolts 33, with an annular disc 38 which engages, near its circumference the supporting arms 31 and which is retained radially with respect to the fly-wheel 10 by an annular collar 39. The disc 38 is thus held immovably both axially and radially with respect to the fly-wheel 10, but it is adjustable rotationally by means of a fixing mechanism 40 (see FIG. 4), and can be set in any one of a plurality of positions. The fixing mechanism 40 comprises a tag 41 which is secured to the disc 38 and extends radially outwardly away from the disc 38. Its free end is located at least partly in the cavity 37. The tag 41 has a bore 42 and a narrower bore 43, which are coaxial. Through the bore 43 extends a stem 44 which has, at the end away from the fly-wheel 10, a set screw 45. The end of the stem 44 away from the set screw 45 has a conical tip 46, which is pressed by a compression spring 47 towards the fly-wheel 10. The compression spring 47 engages the bottom of the bore 42 with its end away from the tip 46. In order to receive the tip 46 the fly-wheel 10 has a plurality of shallow, conical bores 48. The annular disc 38 has three equispaced cylindrical bores 49. On the side facing away from the disc 38 the fly-wheel 10 is provided with an annular cutting plate 50 (see FIG. 3), which is preferably made from hardened material. With its side facing away from the disc 38, the plate 50 engages the surface of the flange 13, which is perpendicular to the centerline 29, so creating an interface between the two coupling members. The cutting plate 50 is secured near its outer periphery to the fly-wheel 10 by means of the bolts 33, which pass through the fly-wheel 10. Between the plate 50 and the disc 38 are arranged three groups of shear pin holders 51. The centerline of each holder 51 is parallel to the centerline 29. Each group of shear pin holders comprises three holders 51 disposed on an arc which is centered on the centerline 29. Each holder 51 is provided with a compression spring 52 which bears at one end on the disc 38 and at the other end on the end of a shear pin 53. The inner diameter of the holder 51 corresponds with, or is slightly smaller than, the diameter of the bores 49 in the disc 38, these bores 49 serving as filling apertures for inserting the shear pins 53 into the holders 51. By means of the fixing mechanism 40 the filling apertures 49 can be rotationally fixed in place after insertion of the shear pins at a distance from the holders 51, so that after loading, the holders 51 can be closed by the disc 38. Each shear pin 53 has a plurality of portions 54 separated from one another by grooves 55. The endmost portion 54 of the shear pin projects out of the cutting plate 50 into a cavity 56 which opens into a recess 57 at the periphery of the flange 13. If desired, the flange 13 may be provided, at least near the cavity 56, with a sleeve of hard steel. The cavity 56 prevents circumferential and inward radial movement of the shear pin. The cavity 56 also limits axial displacement of the shear pin 53. In this embodiment the flange 15 has only one cavity 56 and the associated recess 57, but more cavities, for example three, may be provided so that during operation three shear pins may be simultaneously in a connecting position, depending on the desired maximum torque to be transmitted. Between the outer periphery of the hub 12 and the inner face of the fly-wheel 10 there is a spacer sleeve 58. The hub 12, the sleeve 58 and the fly-wheel 10 are fixed axially on the driven shaft 15 by a washer 59 and a retaining ring 60. There is a small gap between the adjacent ends of the shafts 9 and 15.

The construction described above operates as follows. During operation the baler 1 is driven by the power take-off shaft 4 of the tractor 3 through the propeller shaft 5. The driving gear 6 transmits the drive to the operative parts of the baler 1 so that the pick-up drum 21 picks up the crop lying on the ground and the feeding worm conveyor 22 conveys the picked up crop in a direction transverse of the direction A to the compression channel 20, where the ram 19 compresses the crop into bales by means of the crank mechanism 18, the bales then being delivered at the rear side of the baler 1. The structure of the crank mechanism and the bulk of the ram 19 constitute a large mass which is subjected to rapidly alternating accelerations and decelerations so that constantly varying forces are exerted on the driving gear. The presence of the fly-wheel 10 in the driving gear makes the force exerted on the driving gear more uniform and makes the driving speed more constant. The fly-wheel thus results in an improvement in the quality of the bales formed and in a longer lifetime of the parts of the baler 1.

Figure 2:
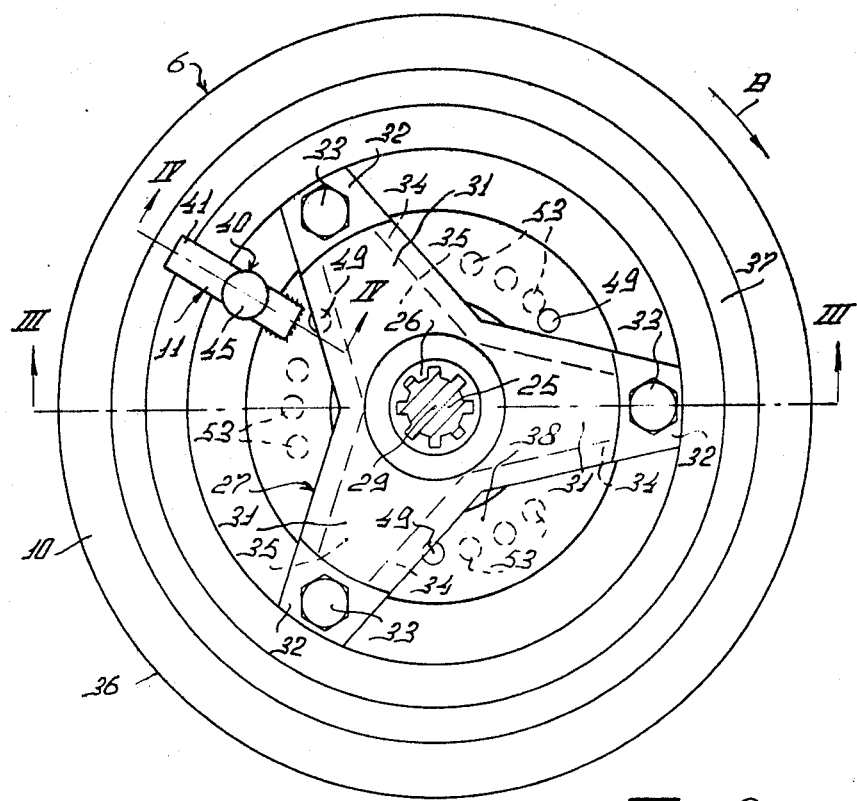
FIG. 2 is an enlarged elevational view of the fly-wheel taken on the line II—II in FIG. 1.

The picked up crop may contain objects which could cause obstruction of the ram 19 or of other mowing parts of the baler 1. Such obstruction, on top of the forces already produced in the baler, could cause overload resulting in extensive damage to the baler. In order to protect the driving gear and the associated parts of the baler 1 against such overload, the shear pin coupling 11 is provided in the event of overload the rigid connection provided by the shear pin 53 in normal operation between the driving shaft 9 and the driven shaft 15, is released by fracture of the shear pin 53. The driving shaft 9 and the fly-wheel 10 rigidly connected to it and forming the first coupling member can rotate freely in the direction indicated by the arrow B (FIG. 2) with respect to the second coupling member formed by the flange 13 and the hub 12. Owing to this relative movement between the coupling members, the broken-off fragment 54 of the shear pin is shot out of the cavity 56 and the recess 57. Owing to the rotation of the fly-wheel 19 (the rate of this rotation is conventionally about 540 or 1000 rev/min depending on the speed of the power take-off shaft) the shear pin cannot then be moved into a new connecting position during the normal rotation of the power take-off shaft because the compression spring 52 does not give the shear pin 53 a great enough acceleration to move it into the cavity 56 during the brief instant when the cavity 56 is opposite the shear pin. The compression spring 52 can shift the shear pin 53 into the cavity 56 only when the speed of the power take-off shaft 4 is appreciably reduced, which requires an intentional operation by the tractor driver. Thus eroneous, premature re-coupling of the two coupling members and a resultant rapid destruction of shear pins or mechanical damage to the machine are avoided. After the shear pin 53 has been moved by the spring 52 into the cavity 56 up to the stop formed by the bottom of the cavity and is thus in a new connecting position, the baler 1 is again ready for normal operation. The overload situation described may recur a great many times before replacement of shear pins is necessary, since nine shear pins, disposed in groups of three, are provided, and each shear pin has a great number of portions 54 (in this embodiment about eight). Therefore, it may be sufficient to provide the shear pin coupling with new shear pins only at the normal service intervals of the baler 1; there is no need for intermediate replacement of shear pins after each overload. The shear pins can be inserted after the disc 38 is turned about the center line 29 so that the filling apertures 49 register with the respective holders 51, the shear pins being successively slipped into the exposed holders 51.

Figure 5:
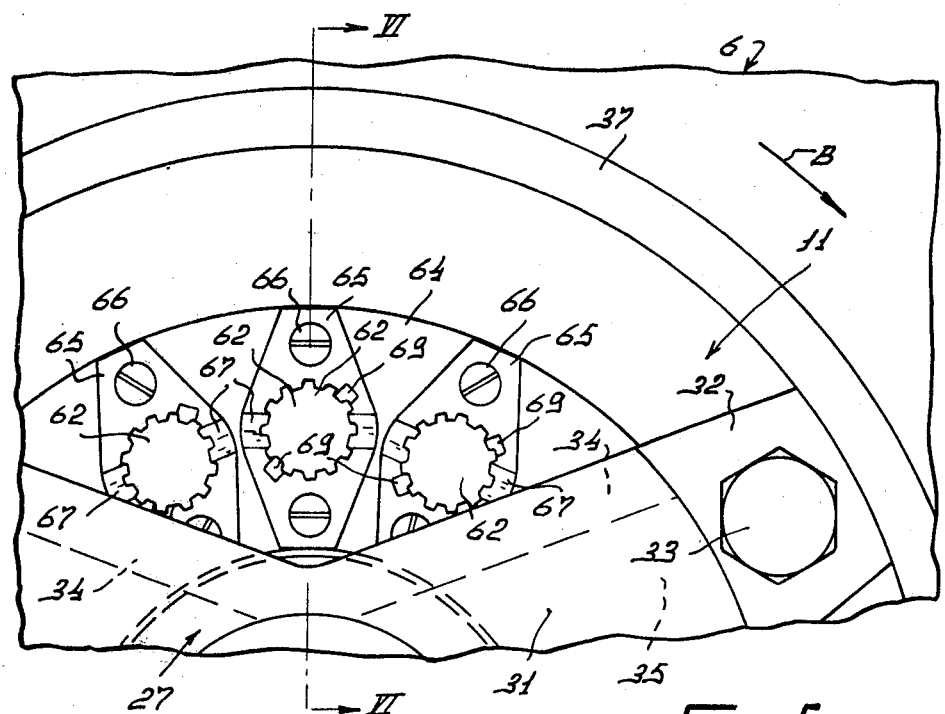
FIG. 5 is an enlarged view, similar to FIG. 2, of part of a second embodiment of the fly-wheel.
Figure 6:
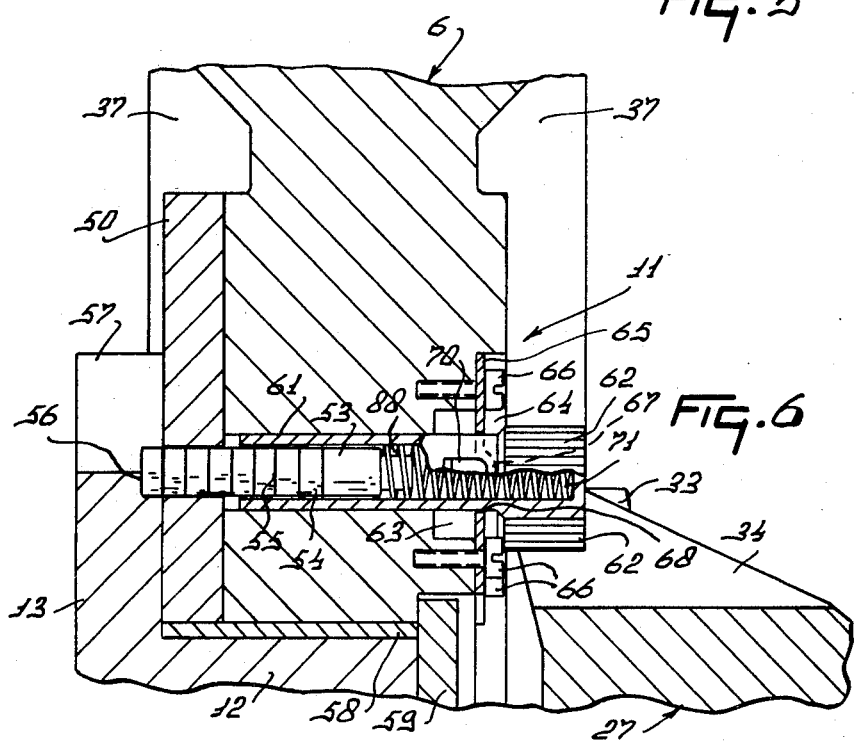
FIG. 6 is a sectional view taken on the lines VI—VI in FIG. 5.
Figure 7:
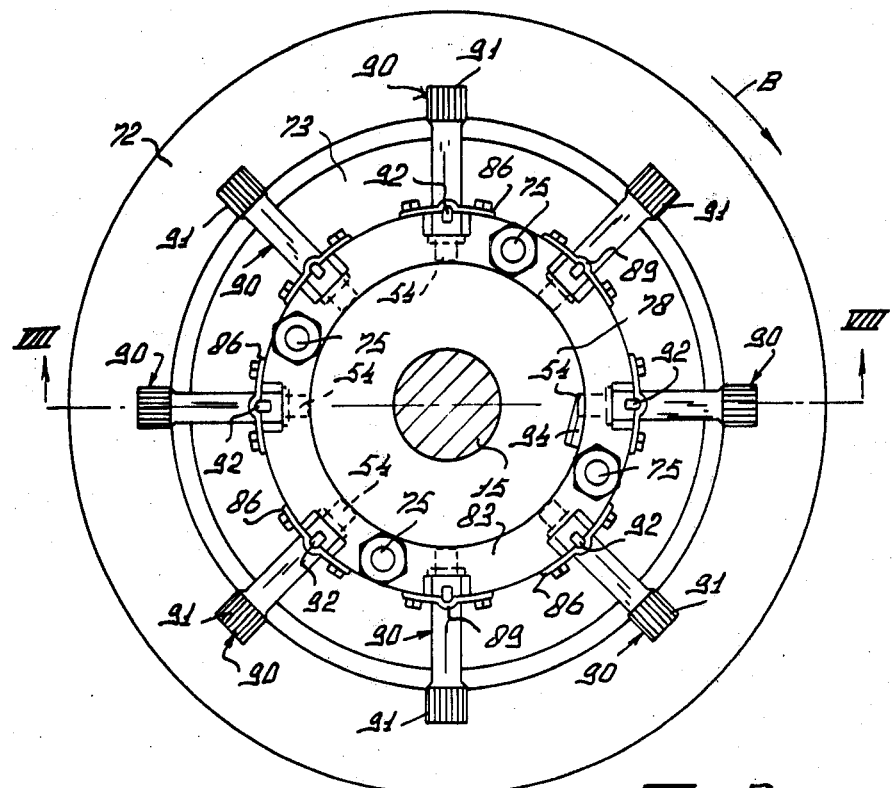
FIG. 7 is a view, similar to FIG. 2, showing a third embodiment of fly-wheel.
Figure 8:
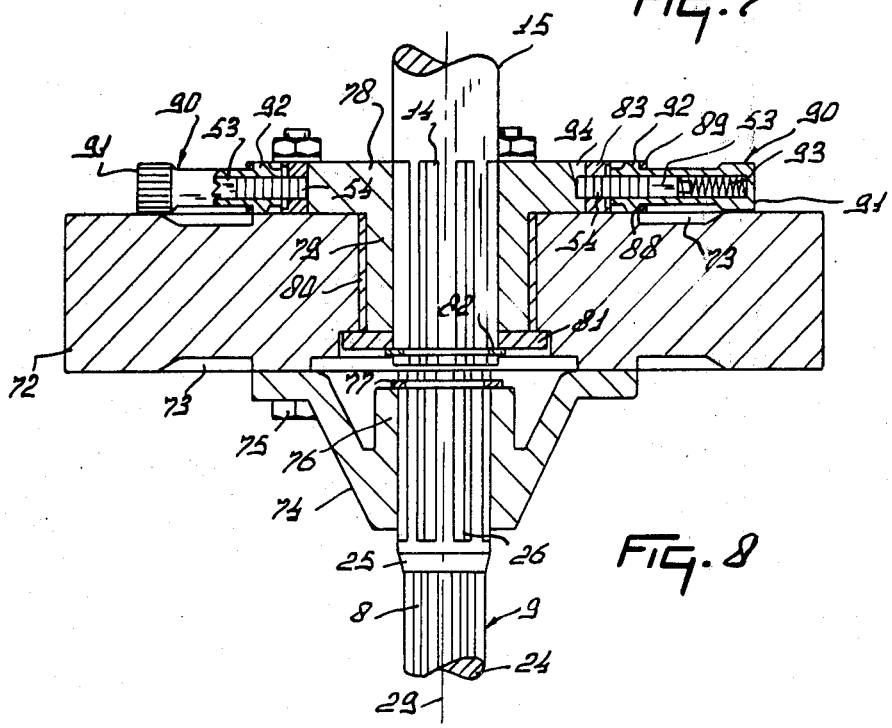
FIG. 8 is a sectional view taken on the lines VIII—VIII in FIG. 7.

In the second embodiment, shown in FIGS. 5 and 6, parts corresponding with those of the first embodiment are designated by the same reference numberals. The shear pin coupling 11 of this embodiment comprises shear pins 53 each held in a holder 61, which comprises a synthetic resin envelope. The holder 61 is provided, at the end away from the second coupling member 12 outside the fly-wheel 10, with a milled knob 62. FIG. 5 shows that the holders 61 are again arranged in groups of three. The bore receiving the holders 61 in the fly-wheel 10 has an increased diameter near the milled knob 62 to form a cylindrical space 63. Adjacent the space 63 the fly-wheel 10 is drilled further to form a space 64. The space 63 is closed by a cover plate 65, which is secured by two screws 66 to the fly-wheel 10. The heads of the screws 66 are located in the space 64. Between the screws 66 the cover plate 65 has a lateral crease 67 (see FIG. 5), the line of symmetry of which is substantially tangential to the centerline 29. The cover plate 65 has a circular opening 68 and two recesses 69 diametrically opposite one another, one on each side of the center of the opening 68, the line between these recesses being at an angle of about 45° to the line of symmetry of the crease 67. The outer wall of the holder 61 is provided with two lugs 70, which are diametrically opposite one another, one on each side of the centerline of the holder 61, and these lugs co-operate in normal operation with the crease 67. Under the action of a compression spring 71 held in the holder one end of the shear pin is pressed against the bottom of the cavity 56 and since the end of the spring away from the shear pin reacts against the closed part of the holder 61, the holder 61 is urged in an axial direction, with respect to the centerline 29, away from the second coupling member 12. The lugs 70 are thus located in the crease 67. To fit the holder 61, the lugs 70 are passed through the recesses 69 and the holder is then turned through about 45° to arrange the lugs behind the crease 67, the crease 67 and the lugs 70 thus providing a quick-action bayonet connection.

The embodiment of the fly-wheel 10 shown in FIGS. 5 and 6 operates in generally the same way as the first embodiment. The shear pins 53 are arranged in this embodiment in releasable holders 61, which can be individually taken out after the milled knob 62 has been turned. Subsequently a new shear pin can be inserted into the holder 61, which can then be rapidly and easily put back into the fly-wheel 10.

Figure 9:
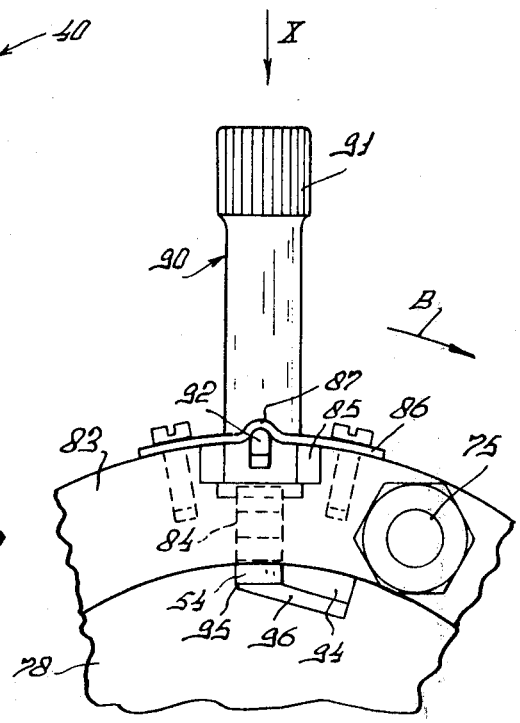
FIG. 9 shows on an enlarged scale a detail of the fly-wheel shown in FIG. 7.
Figure 10:
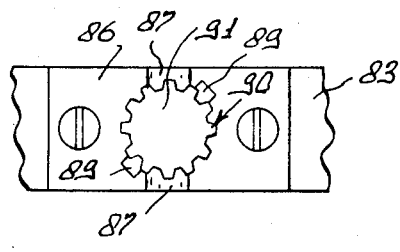
FIG. 10 is an elevational view in the direction of the arrow X in FIG. 9.

In the third embodiment shown in FIGS. 7 to 10 a substantially cylindrical fly-wheel 72 has annular cavities 73. The fly-wheel 72 is rotationally connected by means of a tie member 74 and bolts 75 with the shaft portion 25. The tie member 74 has a hub 76, which is retained axially on the driving shaft by a retaining ring 77. The fly-wheel 72 constitutes a first coupling member of the shear pin coupling 11. The shear pin coupling 13 also comprises a second coupling member constituted by a flange 78 and a hub 79. Between the outer surface of the hub 79 and the inner wall of the fly-wheel 72 there is a spacer sleeve 80. A washer 81 co-operating with a retaining ring 82 prevents an undesirable axial displacement of the hub and the fly-wheel with respect to the driven shaft 15. By means of the bolts 75 a hard-steel ring 83 is connected to the side of the fly-wheel 72 facing the driven shaft, the side of this ring which faces the centerline 29 being in engagement with the outer periphery of the flange 78. The ring 83 provides an additional, axial supporting surface as compared with the structure of the coupling members of the first embodiment, this surface co-operating with the outer perihery of the flange 78. The ring 83 has a number of bores 84 (in this embodiment, eight bores) extending radially with respect to the centerline 29. At the radially outer ends of the bores 84, there are a plurality of bores of larger diameter 85. Each bore 85 is closed at its outer end by a cover plate 86 (see FIGS. 9 and 10), which is provided, like the cover plate 65 of the second embodiment, with an outwardly projecting crease 87. The cover plate 86 also has a circular opening with two recesses 89 disposed diametrically opposite one another, one on each side of the opening 88. A shear pin holder 90 extends through each opening 88 and lies radially with respect to the centreline 29. At the end remote from the ring 83, the holder is provided with a milled knob 91. The shear pin holder 80, which comprises a synthetic resin envelope, has two lugs 92, which, as is shown in FIG. 9, together with the crease 87 operate as a quick-action bayonet connection, the lugs being passed through the recesses 89 and then being turned with the holder 90 through about 45°. The holder 90 is provided with a compression spring 93 which is enclosed at the end adjacent the milled knob 91. The spring 93 pushes the shear pin 53 towards the second coupling member. In order to receive the operative shear pin portion 54 in a connecting position, the flange 78 has at least one opening 94. If the coupling 11 has to transmit a high torque, the flange 78 may have a plurality of openings 94. The opening 94 has a wall portion 95 co-operating with the shear pin portion 54 and from the wall portion 95 the opening 94 extends tangentially with respect to the direction of rotation B of the coupling and widens both in an axial and a radial direction (FIG. 9), the bottom part 96 of the opening being at an acute angle to the associated tangential plane.

The third embodiment of the fly-wheel according to the invention operates as follows. During operation the driving and driven shafts 9 and 15 respectively are rigidly interconnected by means of the shear pin coupling 11 including the fly-wheel 72. The coupling members 72 and 78 are rigidly interconnected by the radial shear pin or pins 53 in the connecting position. It is advantageous in normal operation for the shear pins to be located on the side of the fly-wheel 72 facing the driven shaft 15 so that the shear pins 53 are protected against dirt striking the fly-wheel, thrown up, for example, by the tractor wheels. As in the two preceding embodiments, disengagement of the two coupling members 72 and 78 occurs in the event of overload, the fragment 54 of the shear pin breaking off and being rapidly and effectively removed from the opening 94, which is widened for this purpose with the aid of the bottom portion 96 inclined to the associated tangential plane. After fracture, the fly-wheel is freely rotatable with respect to the driven shaft 15 in the direction of the arrow B. Owing to their radial disposition, the shear pins 53 will be urged radially outwards against the pressure of the spring 93 at the normal speed of the power take-off shaft 4 under the action of centrifugal force exerted on the pins. This speed can be maintained constant by the effect of the centrifugal force exerted on the comparatively heavy fly-wheel 72. It is thus ensured that subsequent to overload, at the normal rate of the power take-off shaft 4, none of the shear pins 53 is capable of assuming a new connecting position in the opening 94 with the aid of the compression springs 93. The tractor driver has first to reduce the speed of the power take-off shaft 4 intentionally, as in the preceding embodiments, before a shear pin 53 can get into a new connecting position by being slipped into the opening 94 down to the bottom portion 96. Also this shear-pin coupling can be used for a very long time and replacement of the shear pins may wait until normal servicing of the baler 1. The replacement of the shear pins can be carried out extremely rapidly and simply be means of the holders 90, which can be fitted by the bayonet connection.

It should be noted that the construction of the fly-wheel forming part of the shear pin coupling in any one of the preceding embodiments may also be successfully employed in other implements than the agricultural implement shown, in which implements a fly-wheel is used and protection against overload is required. A great advantage of the combination of the fly-wheel with a shear pin usable for a long time is that the shear pin can be arranged inside the circumference of the fly-wheel and may even be located completely inside the fly-wheel. Moreover, owing to the large size of fly-wheels comparatively long shear pins may be used, which can thus operate for a long time. As stated above, the shear pins are effectively protected against dirt and damage.

While various features of the fly-wheel that have been described, and that are illustrated in the drawings, will be set forth in the following claims as inventive features, it is to be noted that the invention is not necessarily limited to these features and that it encompasses all of the features that have been described both individually and in various combinations.

What we claim is:

1. A baler comprising a pressing ram and a driving mechanism that drives said ram, said driving mechanism comprising a fly-wheel, said fly-wheel comprising a first member and a second member connected by shear means for rotation together about a common axis, said first member being mounted on a driving shaft and said second member being mounted on a driven shaft, the two members being relatively rotatable with respect to one another about said axis upon overload, said shear means including at least one shear pin slideably mounted in a holder and said pin normally interconnecting said members to prevent relative rotation until overload fractures said pin, advancement means operatively associated with said pin that automatically displaces the remainder of the fractured pin with respect to said axis following overload into operative position in which the two members are reconnected and relative rotation between the two members prevented.

2. A baler as claimed in claim 1, in which said pin is mounted on a side of said fly-wheel.

3. A baler as claimed in claim 2, in which said pin is located entirely within the outer periphery of said fly-wheel.

4. A baler as claimed in claim 3, in which said pin extends radially with respect to the axis of rotation of said fly-wheel.

5. A baler as claimed in claim 2, in which said holder is releasably connected to the side of said first member by a quick-action connection.

6. A baler as claimed in claim 1, in which said advancement means comprises a compression spring in said holder.

7. A baler as claimed in claim 1, in which there are a plurality of pins and holders arranged in groups, each group being arcuate in configuration and centered on the rotary axis of said fly-wheel.

8. A baler as claimed in claim 1, in which said members face one another and one end of said holder is covered at an adjacent end of the driving shaft by a disc located between said members, means retaining said disc on the fly-wheel against movement in axial and radial directions with respect to said axis, said disc being rotationally adjustable about said axis and fixable in any one of a plurality of positions around said axis, said disc having at least one filling aperture through which a shear pin can be inserted into said holder.

9. A baler comprising a pressing ram and a driving mechanism that drives said ram, said driving mechanism comprising a fly-wheel, said fly-wheel comprising a first member and a second member connected by shear means for rotation together about a common axis, said first member being mounted on a driving shaft and the second member being mounted on a driven shaft, the two members being relatively rotatable with respect to one another about said axis upon overload, said shear means including at least one shear pin slideably mounted in a holder, said pin having severable portions and normally interconnecting said members to prevent relative rotation until overload fractures a portion of said pin, advancement means bearing on said pin to automatically displace the remainder of the fractured pin laterally with respect to the axis following overload into operative position that reconnects said two members and prevents relative rotation between the two members, said advancement means normally urging one of the portions of the pin from said first member into a cavity in the second member, said cavity having a recess positioned to receive the fractured pin portion and automatically discharge same upon relative rotation between the members.

10. A baler as claimed in claim 9, in which said cavity widens in an axial and in a radial direction from a wall portion of the cavity which normally supports the shear pin.

11. A baler as claimed in claim 10, in which said cavity is located near the periphery of the second member.

12. A baler as claimed in claim 11, in which said cavity is located in a circular flange of the second member.

* * * * *